United States Patent [19]

Barnabeo et al.

[11] Patent Number: 4,524,201

[45] Date of Patent: Jun. 18, 1985

[54] REACTIVE ORGANO TITANATE CATALYSTS

[75] Inventors: Austin E. Barnabeo; Michael J. Keogh, both of Bridgewater, N.J.

[73] Assignee: Union Carbide Corporation, Danbury, Conn.

[21] Appl. No.: 518,428

[22] Filed: Aug. 2, 1983

Related U.S. Application Data

[62] Division of Ser. No. 334,673, Dec. 28, 1981, Pat. No. 4,415,710.

[51] Int. Cl.³ ............................................. C08G 79/00
[52] U.S. Cl. ...................................... 528/395; 556/54
[58] Field of Search ...................... 528/395; 260/429.5

[56] References Cited

U.S. PATENT DOCUMENTS

| 2,643,262 | 6/1953 | Bostwick | 528/395 |
| 2,680,723 | 6/1954 | Kronstein | 528/395 |
| 2,710,268 | 6/1955 | Kilbournebump | 528/395 |
| 3,491,075 | 1/1970 | Dekking . | |
| 3,904,572 | 9/1975 | Huang et al. . | |
| 4,005,247 | 1/1977 | Graham . | |
| 4,012,567 | 3/1977 | Loveless . | |
| 4,020,214 | 4/1977 | MacKenzie, Jr. . | |
| 4,042,766 | 8/1977 | Tatsukami et al. . | |
| 4,185,051 | 1/1980 | McKenna, Jr. et al. | 528/395 |

Primary Examiner—Bernard Lipman
Attorney, Agent, or Firm—James C. Arvantes; Robert C. Brown

[57] ABSTRACT

The disclosure is directed to preformed, reactive catalysts, which are the reaction products of a mixture containing an organo titanate, a polyol and a monohydric alcohol. These catalysts can be admixed with alkylene-alkyl acrylate copolymers to provide compositions which can be extruded about electrical wires and cables and cured, at improved cure rates, to crosslinked products characterized by improved physical properties.

16 Claims, 1 Drawing Figure

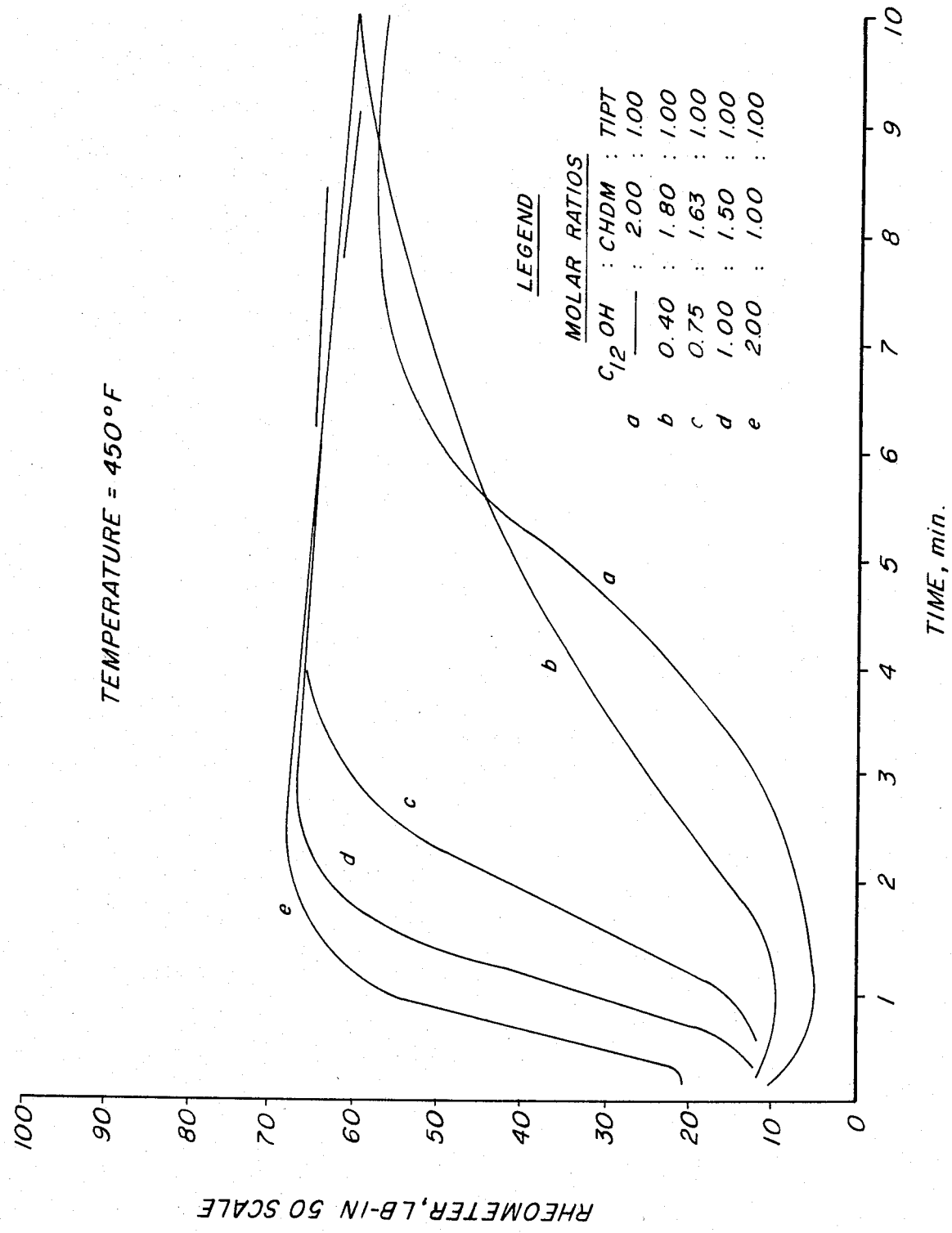

REACTIVE ORGANO TITANATE CATALYSTS

This application is a division of U.S. application Ser. No. 334,673 filed Dec. 28, 1981, now U.S. Pat. No. 4,415,710 patented Nov. 15, 1983.

SUMMARY OF THE INVENTION

This invention relates to preformed, reactive organo titanate catalysts which can be easily and readily dispersed throughout a resin matrix of an alkylene-alkyl acrylate copolymer to provide heat curable compositions having improved cure speeds. The compositions of this invention are particularly useful in extrusion applications, being capable of extrusion, without scorch, about electrical conductors such as electrical wires and cables providing coatings thereon characterized by improved surface characteristics.

DESCRIPTION OF THE DRAWING

Graphs, obtained on testing compositions for cure speed by the Monsanto Rheometer test, and superimposed as depicted in the single FIGURE of the drawing.

BACKGROUND OF THE INVENTION

Currently, protective coatings such as insulation and semi-conductive jacketing, are being applied about wires and cables by extruding thereon resin compositions containing an organic peroxide, and subjecting the resultant articles to elevated temperatures in order to cure the compositions to crosslinked products. The overall operation, commonly referred to as peroxide curing, requires careful control of the process parameters in order to avoid undue heat and pressure build-up in the extruder. Undue heat and pressure build-up results in premature decomposition of the peroxide which, in turn, results in crosslinking of the compositions in the extruder. Crosslinking of the compositions in the extruder, commonly referred to as scorch, necessitates, in most cases, stopping the operation and cleaning the extruder.

DESCRIPTION OF THE INVENTION

In one aspect, the present invention provides preformed, reactive organo titanate catalysts which can be easily and readily dispersed throughout a resin matrix of an alkylene-alkyl acrylate copolymer and serve the dual function of crosslinking the alkylene-alkyl acrylate copolymer to a crosslinked product, while catalyzing the crosslinking reaction.

The heat curable compositions of this invention, comprising an alkylene-alkyl acrylate copolymer and a preformed organo titanate catalyst, can be extruded, without scorch, about electrical wires and cables and cured at improved, i.e. faster, cure speeds providing protective coatings which, being free of voids and gel specks, are characterized by improved surface characteristics.

The preformed, reactive organo titanate catalysts of this invention, which range from liquids to solids at ambient temperatures and pressures, contain the repeating unit having the formula:

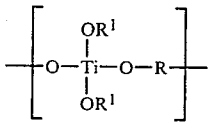

Formula I wherein: R is a divalent hydrocarbon radical usually having a maximum of 18 carbon atoms, generally having 3 to 18 carbon atoms, preferably having 3 to 12 carbon atoms; and each $R^1$, which can be the same or different, is a monovalent hydrocarbon radical usually having a maximum of 18 carbon atoms, generally having 2 to 18 carbon atoms, preferably having 2 to 12 carbon atoms.

Illustrative of suitable monovalent hydrocarbon radicals for $R^1$ are alkyl radicals generally having 2 to 18 carbon atoms, preferably having 2 to 12 carbon atoms such as ethyl, n-propyl, isopropyl, n-butyl, t-butyl, n-hexyl, n-dodecyl and the like; aryl radicals having 6 to 8 carbon atoms such as phenyl, methylphenyl, ethylphenyl and the like; cycloaliphatic radicals having 5 to 8 carbon atoms such as cyclopentyl, cyclohexyl and the like.

Illustrative of suitable divalent hydrocarbon radicals for R are alkylene radicals generally having 3 to 12 carbon atoms, preferably having 3 to 8 carbon atoms such as propylene, butylene, hexylene, octylene and the like; alkoxy radicals generally having 2 to 12 carbon atoms, preferably having 2 to 6 carbon atoms such as methoxymethyl, methoxyethyl, ethoxyethyl, ethoxypropyl, propoxypropyl, propoxybutyl and the like.

The preformed, reactive organo titanate catalysts are produced by reacting a mixture containing an organo titanate, a polyol, preferably a diol and a monohydric alcohol wherein the total (OH) functionality of the polyol and monohydric alcohol is substantially equal to the (OR) functionality of the organo titanate.

By varying the amount of monohydric alcohol reactant relative to the polyol reactant, preformed, reactive catalysts can be produced which range from liquids to solids. Increasing the amount of monohydric alcohol reactant decreases the melting point of the product as shown in the examples.

Thus, the present invention allows for the tailoring of the reactive catalyst, from a solid to a liquid, as desired, to take advantage of the process equipment available for metering of the catalyst to and admixing the catalyst with, the alkylene-alkyl acrylate copolymers.

Exemplary of suitable organo titanates to be used in the preparation of the preformed, reactive organo titanates are compounds having the formula:

Formula II  $Ti(OR^2)_4$ wherein each $R^2$, which can be the same or different, is a monovalent hydrocarbon radical, generally having 2 to 18 carbon atoms, preferably having 2 to 14 carbon atoms.

Among suitable monovalent hydrocarbon radicals for $R^2$ are alkyl radicals such as ethyl, n-propyl, isopropyl, butyl, n-octyl, lauryl, myristyl, stearyl and the like; cycloaliphatic radicals such as cyclopentyl, cyclohexyl and the like; aryl radicals such as phenyl, methylphenyl, chlorophenyl and the like; alkaryl radicals such as benzyl and the like.

Organo titanates falling within the scope of Formula II are known compounds and can be conveniently prepared as described in U.S. Pat. No. 2,984,641 to Leon E. Wolinsky patented May 16, 1961.

Polyols suitable for purposes of this invention are compounds having at least two primary hydroxyl groups attached to non-adjacent carbon atoms and have the general formula HO—R—OH, wherein R is as previously defined.

Illustrative of such polyols are the polyhydric alcohols such as the diols having the formula:

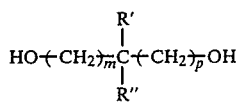   Formula III wherein the sum of m+p is at least 2, preferably 2 to 20 inclusive and R' and R", which can be the same or different are hydrogen or alkyl and when alkyl, contain 1 to 20 carbon atoms. Specific compounds include, among others, propylene glycol, butanediol-1,4, hexanediol-1,6, decanediol-1,10, neopentyl glycol and the like.

Also suitable are the ether diols having the general formula:

   Formula IV wherein a has a value of at least 1, preferably 2 to 20, and x has a value of at least 2, preferably 2 to 10. Among compounds falling within the scope of this formula are di(ethylene glycol), di(propylene glycol), including the commercially available poly(ethylene glycol) and poly(propylene glycol).

Other suitable polyols are the cycloaliphatic polyhydric alcohols such as cyclohexanedimethanol and the like, and other polyols which are described in U.S. application Ser. No. 106,502, now U.S. Pat. No. 4,351,926, filed Dec. 26, 1979 in the name of Michael J. Keogh and assigned to a common assignee, Union Carbide Corporation, the disclosure of which is incorporated herein by reference.

It is to be understood that the polyols can have substituents such as halogen and the like. Utilizing halogenated polyols in the preparation of the preformed, reactive organo titanate catalysts provides these catalysts with a built-in flame retardant capability which is manifested in the alkylene-alkyl acrylate compositions.

Exemplary of suitable monohydric alcohols, which have the general formula $R^1$-OH, are the following: ethyl alcohol, n-propyl alcohol, isopropyl alcohol, n-butyl alcohol, isobutyl alcohol, t-butyl alcohol, n-amyl alcohol, isoamyl alcohol, n-hexyl alcohol, decyl alcohol, lauryl alcohol, myristyl alcohol, cetyl alcohol, stearyl alcohol, benzyl alcohol and the like. Particularly desirable alcohols are the saturated, aliphatic primary alcohols having a maximum of 12 carbon atoms. $R^1$ is as previously defined.

The actual reactants used in preparing the preformed, reactive catalysts are chosen so that the alcohol by-product, as shown by the idealized reaction scheme below, has a boiling point below the boiling point of each reactant. Variables are as previously defined.

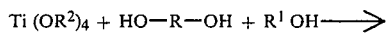

-continued

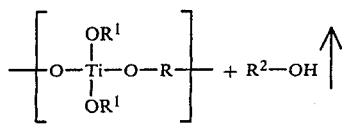

The reaction of a mixture of an organo titanate, a monohydric alcohol and polyol, as described, can be carried out in any suitable vessel, as for example, a stirred autoclave and the like.

The temperature at which the reaction is conducted is not critical and can range from about 25° C. to about 250° C., preferably from about 100° C. to about 200° C.

The reaction can be carried out under atmospheric or subatmospheric pressure. Also, the reaction can be carried out in the presence of a solvent such as toluene, xylene, decalin and the like.

Completion of the reaction, shown by the idealized equation above, is evidenced by cessation of volatiles generated and of no further change in viscosity.

The alkylene-alkyl acrylate copolymers, which are admixed with the preformed, reactive organo titanates to form the compositions of this invention, are known copolymers produced by reacting an alkene with an alkyl acrylate.

Suitable alkenes are ethylene, propylene, butene-1, isobutylene, pentene-1, 2-methylbutene-1, 3-methylbutene-1, hexene, heptene-1, octene-1 and the like; and mixtures thereof.

The alkylene moiety of the alkylene-alkyl acrylate copolymer generally contains from 2 to 18 carbon atoms, preferably 2 to 3 carbon atoms.

Suitable alkyl acrylate monomers which are copolymerized with the alkenes fall within the scope of the following formula:

   Formula V wherein $R_1$ is hydrogen or methyl and $R_2$ is alkyl having one to 8 carbon atoms. Illustrative compounds encompassed by this formula are: methyl acrylate, ethyl acrylate, t-butyl acrylate, methyl methacrylate, n-butyl acrylate, n-butyl methacrylate, 2-ethylhexyl acrylate and the like; and mixtures thereof.

Alkylene-alkyl acrylate copolymers generally have a density (ASTMD-1505 with a conditioning as in ASTMD-147-72) of about 0.92 to about 0.94 and a melt index (ASTMD-1238 at 44 psi tested pressure) of about 0.5 to about 500 decigrams per minute.

For purposes of the present invention, the preferred copolymer generally has about one to about 50 percent by weight combined alkyl acrylate, preferably about 5 to about 30 percent by weight combined alkyl acrylate.

The amount of preformed, reactive organo titanate catalyst admixed with the alkylene-alkyl acrylate copolymers is sufficient to cure the copolymers to cross-linked products. Generally, this amount is on the order of about 0.1 to about 10 percent by weight based on the weight of the alkylene-alkyl acrylate copolymer.

To the compositions of this invention may be added various additives, in amounts well known in the art, such as fillers among which can be mentioned carbon black, clay, talc, calcium silicate, calcium carbonate, silica, aluminum hydroxide and the like, antioxidants such as 1,2-dihydro-2,3,4-trimethylquinoline and the like.

The compositions can be rendered flame retardant by the addition thereto of halogen containing flame retardants such as decabromodiphenyloxide, ethylene(bis-tetra-bromophthalimide), chlorinated polyethylene, polyvinyl chloride and halogenated paraffin waxes, alone, or in admixture with organic or inorganic antimony compounds such as antimony oxide and/or alkaline earth metal oxides, carbonates, hydroxides and sulfates. Among such alkaline earth metal compounds can be noted calcium oxide, calcium carbonate, calcium hydroxide, calcium sulfate, magnesium oxide, magnesium carbonate, magnesium hydroxide and magnesium sulfate; silane coupling agents and the like.

It is to be noted that mixtures of reactants and additives can be used in producing the preformed, reactive catalysts and in formulating the compositions if so desired.

Formulation of the compositions of this invention can be carried out by mixing the components thereof in a suitable mixer such as a Brabender mixer, at elevated temperatures on the order of about 100° C. to about 130° C. until a blend is obtained, as for example, described in reference to the examples which follow. These examples are illustrative of the present invention and are not intended to limit the scope thereof in any manner.

The curing or crosslinking of the compositions is effected by heating the compositions at elevated temperatures on the order of about 180° C. to about 450° C., preferably temperatures on the order of about 230° C. to about 320° C.

Actually, it is preferred to carry out the crosslinking as the last step in the overall extrusion operation wherein the composition is extruded about a wire or cable and the extruded product, once out of the extruder is subjected to the temperatures previously noted while in an inert gas atmosphere, e.g. nitrogen gas.

In order to demonstrate the desirable characteristics of the catalysts and compositions of this invention, preformed, reactive organo titanates were prepared and used in the formulation of compositions described below.

The compositions of this invention were subjected to the Monsanto Rheometer test, which can be used to determine cure speed and the degree of cure or crosslinking.

The Monsanto Rheometer test is fully described in U.S. Pat. No. 4,017,852 granted Apr. 19, 1977, the disclosure of which is incorporated herein by reference. Briefly, FIG. 1 of this patent shows the typical Monsanto Rheometer curve. The cure level (highest crosslink density) is designated as H. It is measured in terms of inch-pounds or torque on the Rheometer test equipment. A higher value for H corresponds to a higher crosslink density.

The preparation of the preformed, reactive organo titanate catalysts was carried out by charging the reactants into a reaction flask, heating the contents of the flask to a maximum temperature of about 150° C. until cessation of volatiles (isopropyl alcohol) generated, at which point there was no further change in viscosity. The final stage of the reaction was conducted under vacuum for ease in recovering the alcohol by-product.

Reactants used in each instance are identified below.

| | MOLAR RATIOS | | | | Isopropyl Alcohol | |
|---|---|---|---|---|---|---|
| | $C_{12}OH^1$ | $CHDM^2$ | $TIPT^3$ | Melting Point | Recovered | Theoretical |
| a (Control) | — | 2.00 | 1.00 | 190° C. | — | — |
| b | 0.40 | 1.80 | 1.00 | 86° C. | — | — |
| c | 0.75 | 1.63 | 1.00 | — | 72.1 | 72.1 |
| d | 1.00 | 1.50 | 1.00 | 68° C. | 35.5 | 36 |
| e | 2.00 | 1.00 | 1.00 | liquid | 71.7 | 72 |

[1] dodecyl alcohol
[2] 1,4-cyclohexanedimethanol
[3] tetraisopropyl titanate

Compositions, the formulations of which are described below, were admixed to a blend in a Brabender mixer, removed from the Brabender mixer and molded into plaques having dimensions of 3 inches by 8 inches by 0.075 inch, in a press, under the following conditions:

| | INITIAL | | FINAL |
|---|---|---|---|
| Pressure = | 200 psi | followed by | 5000 psi |
| Temperature = | 130° C. | | 130° C. |
| Time Cycle = | 7 minutes | | 3 minutes |

Plaques were then used in the Monsanto Rheometer test to obtain a graph for each composition in which Rheometer readings, in inch-pounds, were plotted against time in minutes.

Graphs, obtained on testing each composition at a temperature of 450° F. were superimposed as shown in the accompanying drawing.

| | GRAMS |
|---|---|
| EXAMPLE 1 | |
| Ethylene-ethyl acrylate copolymer composition | 97 |
| Preformed, reactive organo titanate catalyst (b) | 3 |
| EXAMPLE 2 | |
| Ethylene-ethyl acrylate copolymer composition | 97 |
| Preformed, reactive organo titanate catalyst (c) | 3 |
| EXAMPLE 3 | |
| Ethylene-ethyl acrylate copolymer composition | 97 |
| Preformed, reactive organo titanate catalyst (d) | 3 |
| EXAMPLE 4 | |
| Ethylene-ethyl acrylate copolymer composition | 97 |
| Preformed, reactive organo titanate catalyst (e) | 3 |
| CONTROL | |
| Ethylene-ethyl acrylate copolymer composition | 97 |
| Catalyst (a) | 3 |

The formulation of the ethylene-ethyl acrylate copolymer compositions of Examples 1–4 and the Control was as follows:

| | PARTS BY WEIGHT |
|---|---|
| Ethylene-ethyl acrylate copolymer containing 15 percent by weight combined ethyl acrylate - Melt Index 1.3 | 56 |
| Talc coated with zinc stearate | 21.8 |
| Antimony oxide | 2.5 |
| Calcium carbonate | 2.5 |

| | PARTS BY WEIGHT |
|---|---|
| Ethylene(bis-tetrabromophthalimide) (flame retardant) | 16.5 |
| 1,2-di-hydro-2,3,4-trimethylquinoline (anti-oxidant) | 0.6 |
| Vinyl-tris(2-methoxyethoxy)silane (coupling agent) | 0.2 |

As can be seen from the drawing, the compositions of this invention had a faster cure speed as compared to the Control.

EXAMPLE 5

The composition of Example 3 was extruded onto a copper wire and the coating on the wire cured under a nitrogen gas atmosphere at a temperature of 300° C. After the coating was cured and visually inspected, it was stripped off the wire and the stripped material was deformed into plaques, having dimensions of 3 inches by 8 inches by 0.075 inch, in a press under the following conditions:

Pressure: 5000 psi
Temperature: 130° C.
Time Cycle: 7 minutes
Appearance of coated wire—smooth exterior surface, no voids or gel specks
Cure level (Monsanto Rheometer test)=62 inch-lbs.
Time of cure=2 minutes.

What is claimed is:

1. A preformed, reactive catalyst, capable of crosslinking an alkylene-alkyl acrylate copolymer to a crosslinked product while catalyzing the crosslinking reaction, which is the reaction product of a mixture containing an organo titanate, a polyol having at least two primary hydroxy groups attached to non-adjacent carbon atoms and a monohydric alcohol, said reactive catalyst containing the repeating unit:

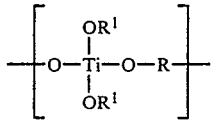

wherein R is a divalent hydrocarbon radical and each $R^1$ is a monovalent hydrocarbon radical.

2. A catalyst as defined in claim 1 wherein the organo titanate has the formula:

$$Ti(OR^2)_4$$

wherein each $R^2$ is a monovalent hydrocarbon radical.

3. A catalyst as defined in claim 1 wherein the polyol has the formula:

wherein R is a divalent hydrocarbon radical.

4. A catalyst as defined in claim 1 wherein the monohydric alcohol has the formula:

$$R^1OH$$

wherein $R^1$ is a monovalent hydrocarbon radical.

5. A catalyst as defined in claim 1 wherein the organo titanate is tetraisopropyl titanate.

6. A catalyst as defined in claim 1 wherein the polyol is 1,4-cyclohexanedimethanol.

7. A catalyst as defined in claim 1 wherein the monohydric alcohol is dodecyl alcohol.

8. A preformed, reactive catalyst as defined in claim 1 wherein R is a divalent hydrocarbon radical having a maximum of 18 carbon atoms and each $R^1$ is a monovalent hydrocarbon radical having a maximum of 18 carbon atoms.

9. A preformed, reactive catalyst as defined in claim 8 wherein R is a divalent hydrocarbon radical having 3 to 18 carbon atoms and $R^1$ is a monovalent hydrocarbon radical having 2 to 18 carbon atoms.

10. A preformed, reactive catalyst as defined in claim 1 wherein: the organo titanate has the formula, $$Ti(OR^2)_4$$

and each $R^2$ is a monovalent hydrocarbon radical; the polyol has the formula, $$HO-R-OH$$

and R is a divalent hydrocarbon radical; and the monohydric alcohol has the formula, $$R^1OH$$

and $R^1$ is a monovalent hydrocarbon radical.

11. A preformed, reactive catalyst as defined in claim 10 wherein each $R^2$ is a monovalent hydrocarbon radical having a maximum of 18 carbon atoms, R is a divalent hydrocarbon radical having a maximum of 18 carbon atoms and $R^1$ is a monovalent hydrocarbon radical having a maximum of 18 carbon atoms.

12. A preformed, reactive catalyst as defined in claim 10 wherein each $R^2$ is a monovalent hydrocarbon radical having 2 to 18 carbon atoms, R is a divalent hydrocarbon radical having 3 to 18 carbon atoms and $R^1$ is a monovalent hydrocarbon radical having 2 to 18 carbon atoms.

13. A preformed, reactive catalyst as defined in claim 10 wherein each $R^2$ is an alkyl radical, R is an alkylene radical and $R^1$ is an alkyl radical.

14. A preformed, reactive catalyst as defined in claim 13 wherein each $R^2$ is an alkyl radical having 2 to 14 carbon atoms, R is an alkylene radical having 3 to 12 carbon atoms and $R^1$ is an alkyl radical having 2 to 18 carbon atoms.

15. A preformed, reactive catalyst as defined in claim 13 wherein each $R^2$ is an alkyl radical having 2 to 14 carbon atoms, R is an alkylene radical having 3 to 8 carbon atoms and $R^1$ is an alkyl radical having 2 to 12 carbon atoms.

16. A preformed reactive catalyst as defined in claim 1 wherein the organo titanate is tetraisopropyl titanate, the polyol is 1,4-cyclohexanedimethanol and the monohydric alcohol is dodecyl alcohol.

* * * * *